Figure 1:
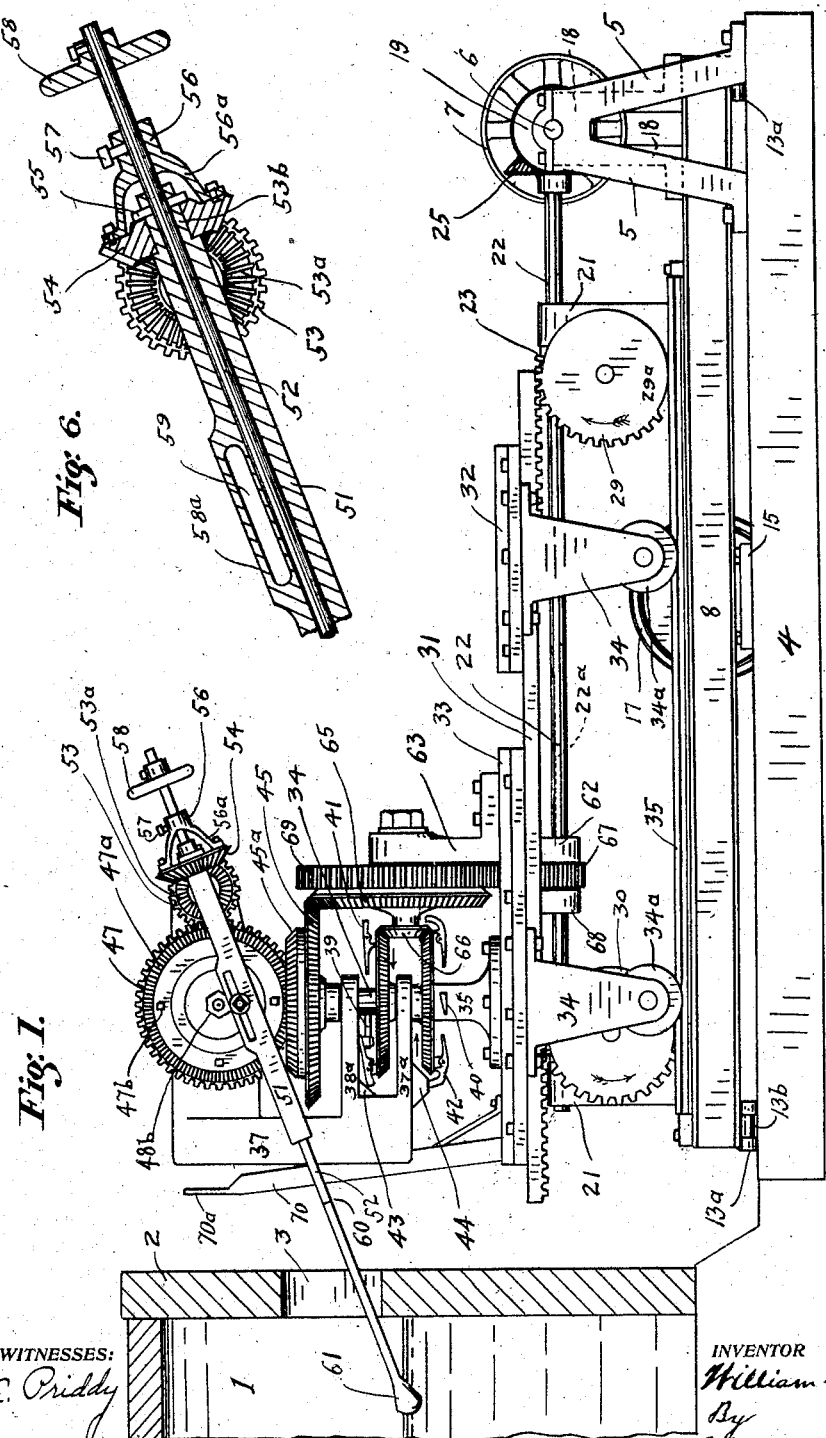

No. 842,051. PATENTED JAN. 22, 1907.
W. ALLES.
MACHINE FOR GATHERING GLASS.
APPLICATION FILED MAR. 16, 1906.

5 SHEETS—SHEET 1.

WITNESSES:
INVENTOR
William Alles
By
Thomas L. Ryan
ATTORNEY

No. 842,051. PATENTED JAN. 22, 1907.
W. ALLES.
MACHINE FOR GATHERING GLASS.
APPLICATION FILED MAR. 16, 1906.
5 SHEETS—SHEET 4.

WITNESSES:
Clara C. Priddy
Clifford R. Hilty

INVENTOR
William Alles
By
Thomas L. Ryan
his ATTORNEY

No. 842,051. PATENTED JAN. 22, 1907.
W. ALLES.
MACHINE FOR GATHERING GLASS.
APPLICATION FILED MAR. 16, 1906.

5 SHEETS—SHEET 5.

WITNESSES:
Clara A. Priddy
Clifford R. Hilty

INVENTOR
William Alles
BY Thomas L. Ryan
ATTORNEY

UNITED STATES PATENT OFFICE.

WILLIAM ALLES, OF MUNCIE, INDIANA.

MACHINE FOR GATHERING GLASS.

No. 842,051. Specification of Letters Patent. Patented Jan. 22, 1907.

Application filed March 16, 1906. Serial No. 306,345.

*To all whom it may concern:*

Be it known that I, WILLIAM ALLES, of Muncie, Delaware county, in the State of Indiana, have invented a new and useful Machine for Gathering Glass; and I declare the following to be a full, clear, and exact description thereof, reference being had to the accompanying drawings, in which similar numerals of reference refer to corresponding parts throughout the several views.

The object of this invention is to construct a practical apparatus for the gathering from the molten supply of glass retained in the well-known form of tank or retort of the mass or charge of glass intended for molding or pressing and for the withdrawal from the tank of said mass and the delivery of the same to the location of the mold or die apart from said apparatus, where the same is severed by the operative or by independent pressing and shearing mechanism being worked in conjunction with the mold, as the case may be, and the charge then deposited in the mold wherein is completed the formation of the product for which my newly-invented machine is especially adapted to gather, such as fruit-jars, jar-lids, bottles, and the like.

A further object is to provide a machine of the kind designated whereby the gathering of the glass may be performed rapidly and regularly and whereby may be dispensed with the services of skilled workmen now necessary in the work of gathering glass for the purposes aforesaid.

The features of this invention consist of a movable carriage suitably positioned with reference to the opening of the glass-tank and mounted so as to move smoothly reciprocally on an underlying movable frame, said carriage at the ends of its forward and rearward travel having periods of repose of short duration, and a punty revolubly and oscillatively horizontally and vertically supported on said carriage, the entire machine being so constructed and the parts thereof so ingeniously combined and arranged that all of its movements will be automatic and will be actuated by the ordinary driving means of belt and pulley.

In addition to the foregoing features of the invention are the new and useful improvements in the details of construction and the peculiar combination and arrangement of the parts, all of which are shown in the drawings accompanying this specification and in the following description and claims.

Figure 2:
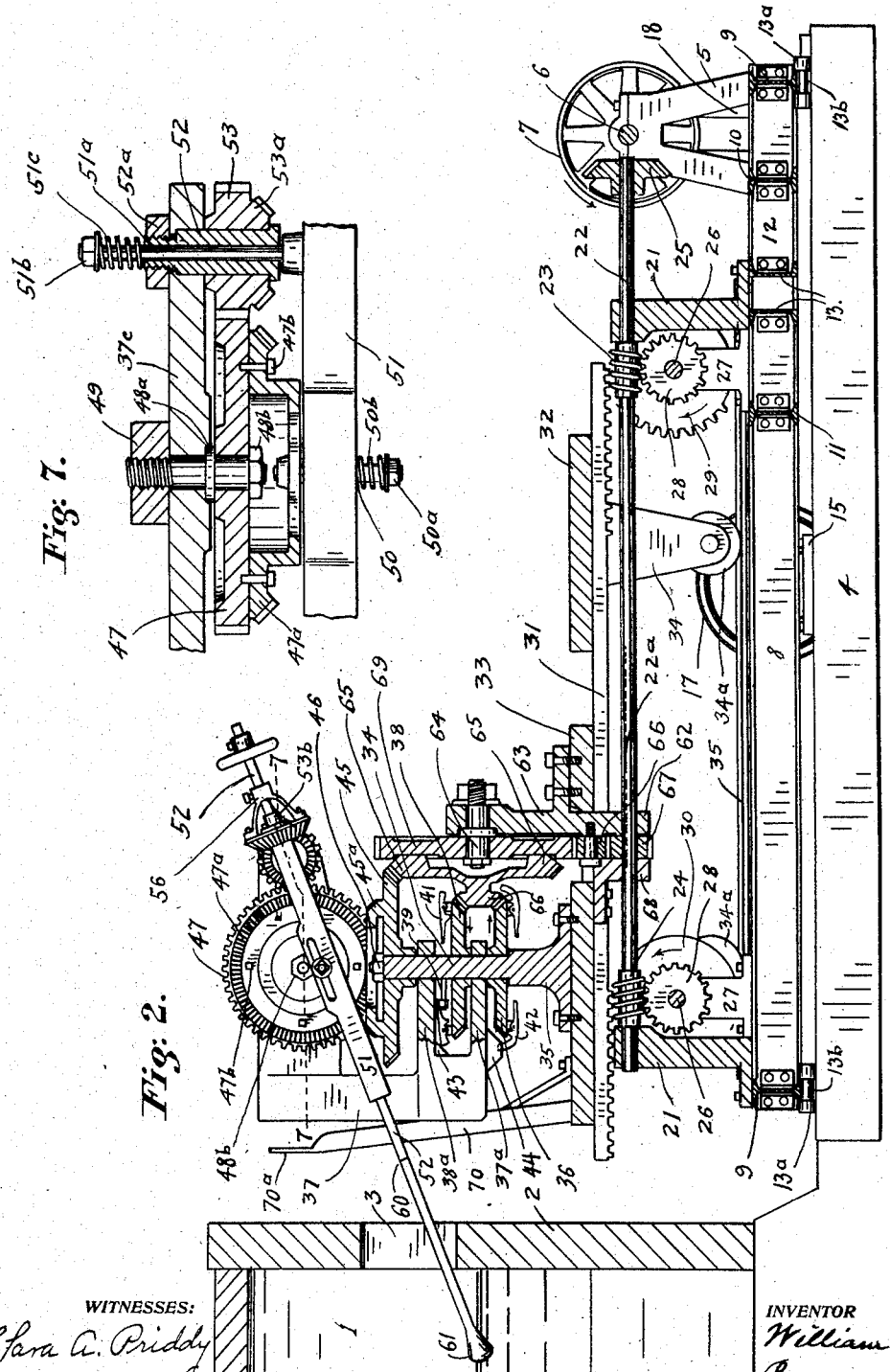
Figure 3:
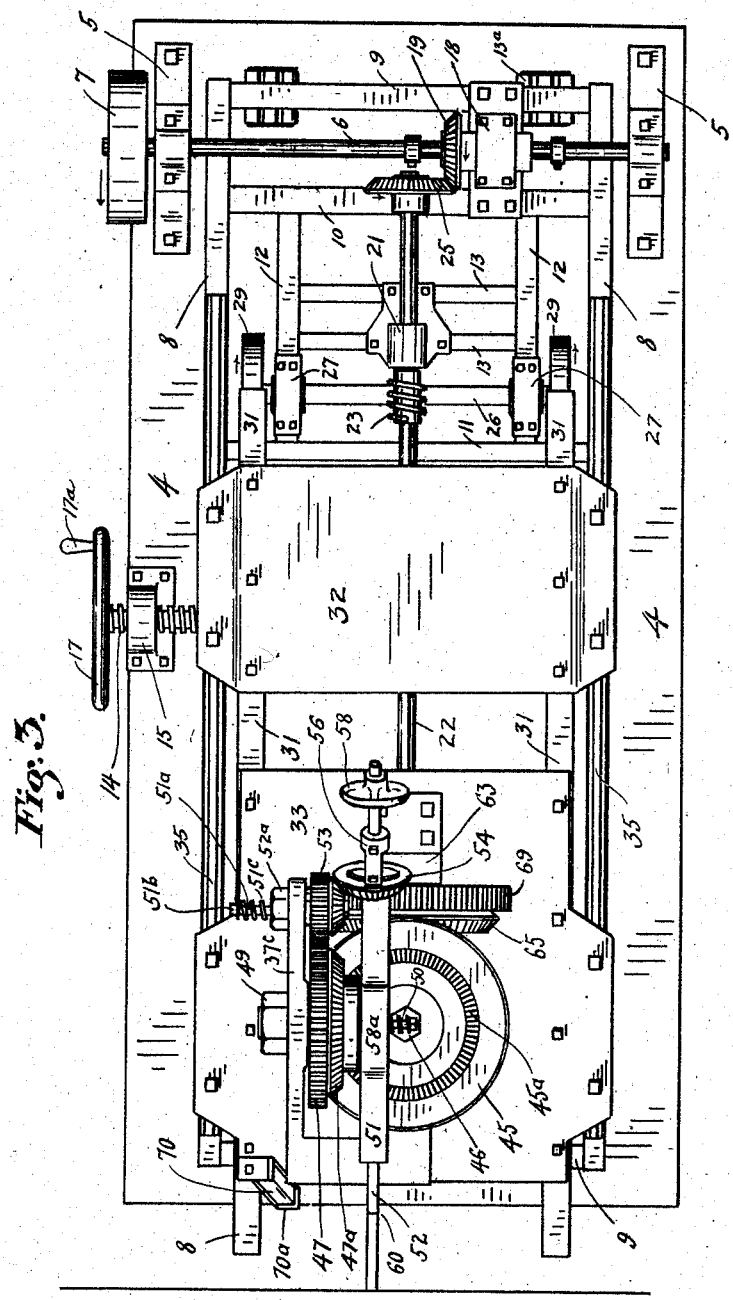
Figure 4:
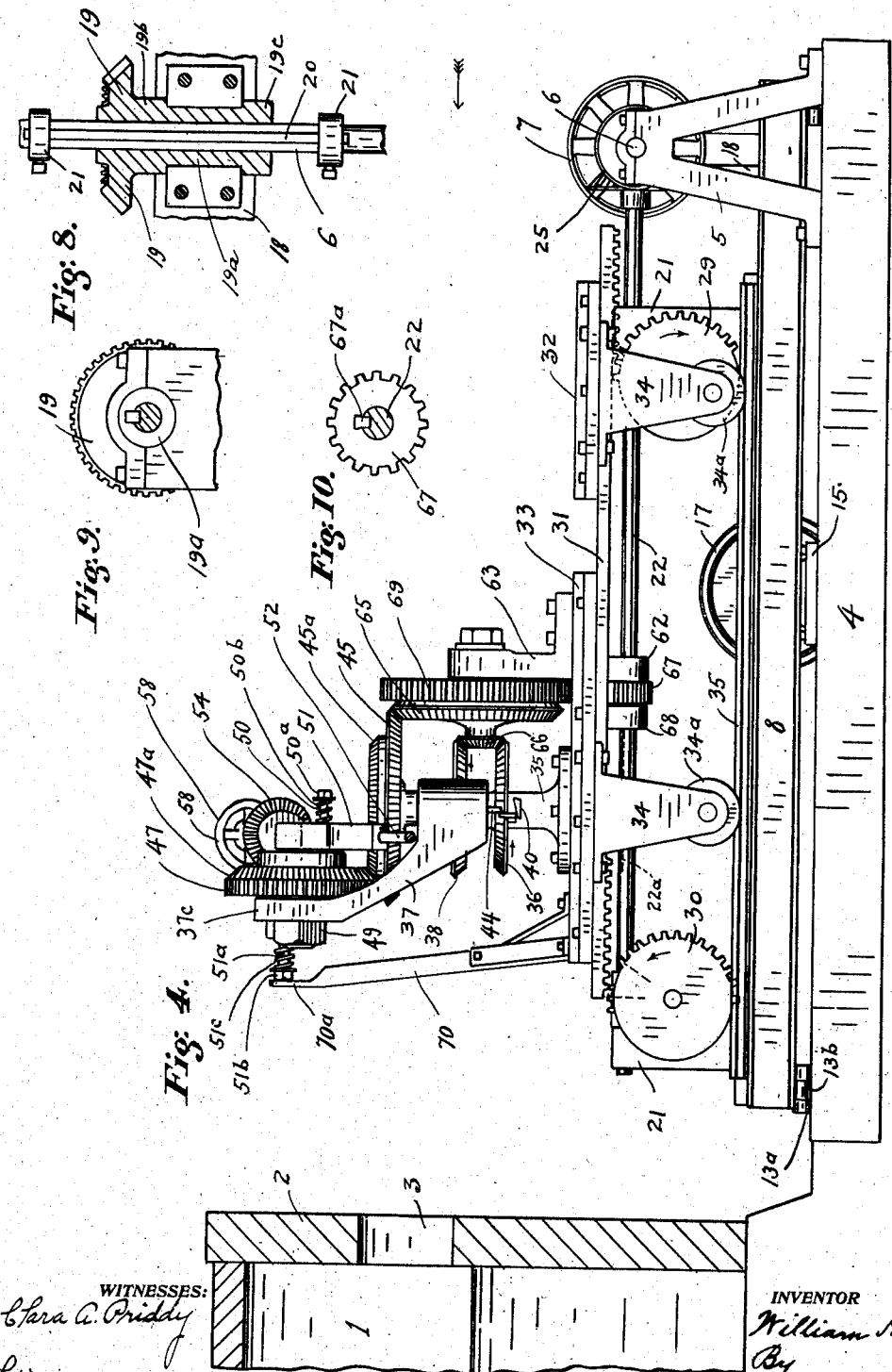
Figure 5:
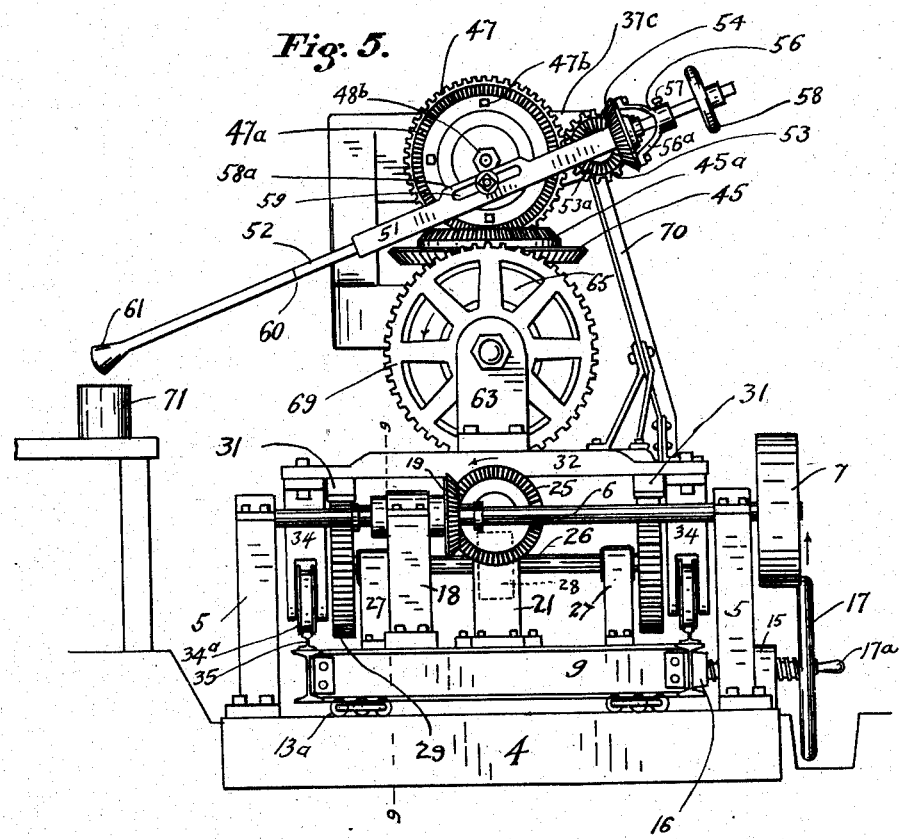
Figure 11:
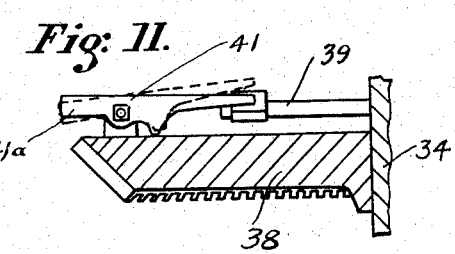
Figure 12:
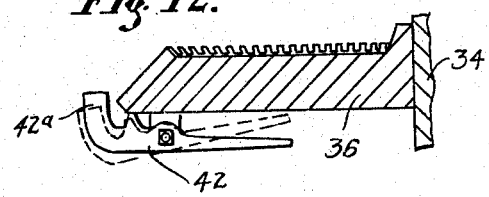
Figure 13:
Figure 14:
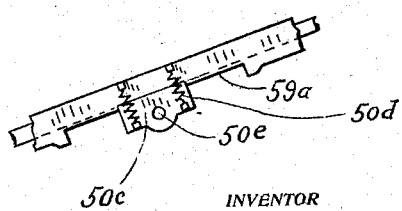

In the drawings, Figure 1 presents a vertical longitudinal section of the frontal portion of a tank in which is retained the molten glass and a side elevation of my machine complete, the carriage thereof projected to its forward position, the punty having been lowered into the glass in readiness for the operation of gathering a supply therefrom; Fig. 2, a longitudinal vertical section of Fig. 1, the punty mechanism being shown in elevation; Fig. 3, a top plan view of the machine complete as the same appears in Fig. 1; Fig. 4, a side elevation of the machine, the carriage being in its extreme rearward position, the punty-shaft being broken away. Fig. 5 represents an end view of the machine as viewed in the direction of the arrow shown in Fig. 4. Fig. 6 represents a detached enlarged vertical longitudinal sectional view of the punty-rod holder and gearing. Fig. 7 is a detached enlarged horizontal sectional view of the punty mechanism on the line 7 7, Fig. 2. Fig. 8 is a detached enlarged horizontal sectional view of the gear-wheel 19. Fig. 9 represents a vertical sectional view of the gear-wheel 19 and its boxing, part of the latter being broken away on the line 9 9, Fig. 5. Fig. 10 is a detached enlarged view of the gear-wheel 67. Fig. 11 is a detached enlarged view of the trigger 41; Fig. 12, a detached enlarged view of the trigger 42, and Fig. 13 a detached enlarged view of the head for the trips 39 and 40. Fig. 14 is a detached enlarged view of a modified form of punty-rod holder and connection therefor.

1 designates a tank in which is retained the molten glass. 2 designates the front wall thereof, provided with the opening 3, through which is operated inwardly and outwardly the gathering means.

Located in front of the tank-wall and extending therefrom at a right angle is the suitable foundation-bed 4, of cement or stone. Rigidly secured to the foundation are the oppositely-disposed standards 5, in which are journaled the transversely-extending shaft 6, with the pulley 7 rigidly secured thereon, the function of which shaft and pulley will be hereinafter disclosed.

The frame of my machine is constructed of the I-beams 8, bound securely together by the transverse I-beams 9 and 10 and the channel 11, as plainly shown in Fig. 3 and Fig. 4, by the suitable angle connections. (Shown in Fig. 2.) 12 designates I-beams connected in like manner between the beams 10 and 11. 13 designates channels connected in like manner between the beams 12. This frame rests movably on the foundation, being provided thereunder at its ends with the four sets of rollers 13ª. These rollers are provided with the wide grooves 13ᵇ, adapted to receive the lower flanges of the transverse I-beams 9, whereby the frame and the structure mounted thereon are rendered movable on a line parallel with the front wall of the tank. To provide for the easy shifting of the structure within a limited extent is provided the screw 14, supported in the block 15, rigidly secured to the foundation. The inner end of the said screw is revolubly and securely connected to the frame at the central portion of the side beam 8 by the suitable block 16. On the outer end of this screw is rigidly secured the hand-wheel 17, having the handle 17ª, as shown in Fig. 3 and Fig. 5. It will be seen that by the manipulation of the hand-wheel the entire structure may be shifted.

This invention is not limited to the application of the single shifting device described, as it is obvious another or even a third could be used without departing from the nature or principle of the invention.

Resting upon and rigidly secured to the I-beams 9 and 10 is the pillow-block 18, in which is journaled the bevel-gear wheel 19, having the integrally-formed journal 19ª between the shoulders 19ᵇ and 19ᶜ so adapted that while it is free to revolve in its journal-box 18 lateral movement of the same is prevented, as plainly shown in Fig. 8. Provided in the journal 19ª is the suitable aperture which forms a bearing for the shaft 6, in which shaft and the bore of the journal are correspondingly-adapted slots for the reception loosely of the feather 20 of such suitable length that when it is secured immovable to the shaft 6 by the collars 21 the shaft will move slidingly within said gear-wheel and journal when the machine is shifted transversely. Journaled in the pillow-blocks 21, rigidly secured to the frame, is the longitudinally-extending shaft 22, having secured thereon the left and right worm-gears 23 and 24, respectively, so adapted that their outer ends will bear against the inner faces of the pillow-blocks, thereby preventing longitudinal movement of the shaft in the journals. Secured rigidly to the rearward end of the shaft 22 is the bevel-gear wheel 25, meshing in the bevel gear-wheel 19, above described.

26 designates transverse shafts in the pillow-blocks 27, supported on and rigidly secured to the beams 12. At the central portions of these shafts are rigidly secured the worm gear-wheels 28, and at the outer ends are rigidly secured the pairs of rack-wheels 29 and 30.

By the description thus far it is shown that by the revolution of the shaft 6 the shaft 22 is revolved, the left and right worm-gears thereon driving the pairs 29 and 30 of the rack-wheels in directions opposite, as shown by the arrows in Fig. 1. These rack-wheels are provided on a certain portion of their peripheries with the suitable gear-teeth, as shown, the remainder of the peripheries being smooth.

31 designates the oppositely-disposed rack-bars of the carriage, which are rigidly secured to and retained their proper distance apart by the base-plates 32 and 33, the latter performing the additional function of providing a support for all of the superincumbent portion of the machine. Both of these plates are at their outer parallel edges supported on and secured rigidly to the trucks 34, having the double-flanged wheels 34ª, which roll upon the pair of T-rails 35, secured to the side beams 8 of the frame. Thus it is readily seen that the carriage is free to be reciprocated on the T-rails of the frame.

Referring to Fig. 1, it will be observed that the racks on the bars 31 extend inwardly from the opposite ends a short distance only. The lengths of these racks are the measure of the forward and rearward movement of the carriage, and the teeth of the rack-wheels 29 and 30 extend over a distance on the periphery of each equal to the length each of the racks. In the operation of my machine it will be seen that these pairs of rack-wheels will be constantly revolving and in directions opposite, the wheels 29 being adapted to propel the carriage rearwardly and the wheels 30 forwardly. It will be necessary for the carriage supporting the gathering mechanism to rest unmoved at each end of its forward and rearward travel for the purpose to be hereinafter disclosed. To provide for this, the teeth of the rack-wheels occupy of the periphery each not quite one-half thereof, so that in the revolution of these wheels in opposite directions there will be the passing of the blank-spaces 29ª and 30ª, when the rack-bars will not be actuated. Reference will be made later to this feature, wherein the operation of my improved machine will be described.

Rigidly secured to the base-plate 33 at the central portion thereof is the vertical post 34, formed integral with the substantial base 35 thereof. Journaled on this post 34, and resting on the shoulder formed by the base 35 is the horizontally-disposed bevel gear-wheel 36. Between the horizontal arms 37ª of the punty-mechanism support 37, which are pivotally secured to the shaft 34, is a second bevel gear-wheel 38, journaled in like manner and of the same diameter as the bevel gear-wheel 36. Rigidly secured to and projecting from the vertical post 34, horizontally and in a longitudinal direction, is the trip 39, and in like manner projecting transversely from the base 35 is the trip 40, as shown in Figs. 1 and 2 and in Figs. 11 and 12. The heads of these trips are wedge-shaped, as plainly shown in Fig. 13. Their functions will be hereinafter referred to.

Pivotally secured to the suitable lugs formed integrally upon the bevel gear-wheels 36 and 38 are the triggers 41 and 42, having the noses $41^a$ and $42^a$, as shown in Fig. 2, Fig. 1, and in Figs. 11 and 12. The noses of these triggers are adapted to engage the lugs 43 and 44, respectively, and the inwardly-extending tapered arms of these triggers are of such weight as that the triggers will normally reside in the positions as shown in Fig. 11 and Fig. 12, and when in the revolution of the bevel gear-wheels 36 and 38 in the opposite directions, as indicated by the arrows, they are brought into alternate engagement with the trips 39 and 40 these triggers will be tilted into the positions shown by the dotted lines, and they are released from their engagement with the lugs 43 and 44. The triggers have thus been described in detail at this stage of the specification of my invention, so that the description of the operation of the machine may be hereinafter readily understood.

Journaled on the vertical post 34 at its upper end is the bevel gear-wheel 45, its hub resting on the arm $38^a$ and retained in correct position by the screw-cap 46. Formed integrally upon the upper face of this wheel is the bevel gear-wheel $45^a$, its teeth meshing in the teeth of the bevel gear-wheel $47^a$, secured rigidly by the bolts $47^b$ upon the vertically-disposed gear-wheel 47, which is pivotally supported on the arm $37^c$ of the punty-mechanism support, all as plainly disclosed in Figs. 1, 2, and 7. The journal for this gear-wheel 47 is composed of the shaft having the shoulder $48^a$ formed thereon and adapted to rest within a corresponding annular groove provided in the arm $37^c$, the forwardly-extending portion of this shaft forming the journal for said wheel and provided with the suitable screw-cap $48^b$, the rearwardly-extending portion passing through the arm and provided with the nut 49, whereby the same may be tightened into and retained securely in position. The bevel gear-wheel $47^a$, as plainly shown in Fig. 2 and Fig. 7, is provided with the disk-shaped face formed with suitable central opening through which access may be had for manipulation of the screw-cap $48^b$. Rigidly secured to the suitable enlarged portion of the vertical flange of the face of this bevel gear-wheel $47^a$ is the forwardly-extending shaft 50, of suitable length to pass through the slot of and beyond the outward face of the punty-rod holder 51 and provided with the screw-cap $50^a$, whereby the coil-spring $50^b$ is held in contact with the punty-rod holder, retaining it in position normally against the face of the wheel $47^a$. A modified form of punty-rod holder and connection detail will be later described.

Referring now to Fig. 7, journaled on the transversely-extending hollow shaft 52 and meshing with the gear-wheel 47 is the gear-wheel 53, having the integrally-formed bevel gear-wheel $53^a$ on its front. This shaft is shouldered so that when the same is inserted in the suitable opening in the arm $37^c$ and fastened by the nut $52^a$ the gear-wheel 53 will be revolubly supported independent of the shaft $51^a$, which is pivotally retained in the hollow shaft 52 and rigidly connected to the end of the punty-rod holder and having the screw-cap $51^b$ adapted to retain in position thereon the coil-spring $51^c$, whereby the fixed end of the punty-rod holder is normally retained in the position as shown in Fig. 7. The punty-rod holder 51, as plainly shown in Fig. 6, is substantially square in cross-section, of suitable length to properly sustain the punty-rod 52, and at its pivotally-fixed end is provided with the shoulder $53^b$, upon which is journaled the bevel gear-wheel 54, sustained in revoluble position by the pins 55, secured in the shoulder 53. 56 designates a sleeve loosely positioned on the punty-rod and by the integrally-formed arms $56^a$ rigidly secured to the gear-wheel 54. By the set-screw 57 the same may be tightened on the punty-rod, so that the same will revolve with the gear-wheel 54. 58 designates a suitable hand-wheel secured to the punty-rod, whereby it may be adjusted in or removed from the holder after loosening the set-screw 57. Provided on the upper side of the punty-rod holder is the enlarged portion $58^a$, having the longitudinal slot 59, in which the shaft 50 slidingly resides. It will be understood that with the revolution of the wheel $47^a$ the punty-rod holder will be oscillated through a given radius. When in the downward movement of the punty it is desired to have it come to rest at a point other than the point normally reached by the arrangement and operation of the parts described, the modified form for the connection of the punty-rod holder 51 to the shaft 50 is used, as shown in Fig. 14. By simply removing the nut $50^a$ and the spring $50^b$, the nut $51^b$ and the spring $51^c$, the punty-rod holder may be removed. The modified form of a punty-rod holder has on its lower side the guideway $59^a$. $50^c$ designates a guide-box provided with a suitable groove in its upper surface in which rests slidingly the punty-rod holder. This guide-box has the suitable transverse aperture $50^c$, adapted to admit freely the shaft 50, and is yieldingly secured to the punty-rod holder by the coil-springs $50^d$. At a suitable position underneath the line where the punty-rod holder descends with its charge of glass either on the machine or at a proper position apart from the machine is provided a suitable vertically-adjustable stop-post, whereby the downwardly descent of the punty with its charge of molten glass may be terminated at a point other than that reached by the normally disposed punty-rod holder as described. The punty-rod is terminated at the point 60 and there provided with suitably-threaded opening to receive the correspondingly-threaded punty-shaft carrying the integrally-formed punty 61. In the base-plate 33 is provided a suitable opening through which extends the downwardly-disposed member 62 of the pillow-block 63, as plainly illustrated in Fig. 2. Journaled on the shaft 64 of the pillow-block is the gear-wheel 69, which meshes with the idler-gear 66, properly journaled below and which in turn meshes with the gear-wheel 67, slidingly secured on the shaft 22 and retained in mesh with the idler-gear 66 by the pillow-block 68, positioned opposite the member 62 and secured to the under side of the base-plate 33. Rigidly secured to the face of the gear-wheel 69 is the bevel gear-wheel 65, adapted to mesh with the bevel gear-wheel 45 and having the secondary gear-wheel 66, formed integral thereon, adapted to mesh with the bevel gear-wheels 36 and 38, revolving them in opposite directions. In the shaft 22 is provided the longitudinal slot 22$^a$, in which slidingly resides the key 67$^a$, rigidly secured in the gear-wheel 67, as shown plainly at Fig. 10. By this arrangement the motion of the shaft 22 will be imparted to the punty mechanism at all stages of the movement of the carriage.

70 designates an upwardly-extended member rigidly secured to the carriage, the head 70$^a$ being retained in such position with reference to the punty revolving and horizontally oscillating mechanism that when the carriage has reached the end of its rearward travel and the punty mechanism has been oscillated into the position as shown in Fig. 4 the head 51$^b$ of the shaft 51$^a$ will repose against it, thereby straining the spring 51$^c$ and pressing the gear-wheel 54 out of mesh and stopping the revolution of the punty-bar.

For the purpose of illustrating the purpose of the movements of the machine and its divers parts, as will be disclosed in the description hereinafter of its operation, the glass-mold 71 has been shown positioned at a suitable location and elevation with reference to the position of the machine. For the purpose of easily shifting the machine transversely, so that the punty may be brought to proper registry with such fixed glass-mold or pressing-die for which it may be operating, there is provided the screw 14 and the hand-wheel device 17 hereinbefore described. This machine is of especial utility and is designed and used for the gathering of glass for molds or dies operated upon by pressing-machines, and by reason of its regularity of movement and the speed with which it may be operated it renders unnecessary the employment of the service of human gatherers.

As an aid to the clear understanding of the description of the operation of my machine reference will be had throughout the drawings to the arrows, which indicate the directions traveled by the divers wheels and movable parts of the machine. The position occupied by the machine and its parts when in readiness for the commencement of its operation are as shown in Fig. 4, the punty mechanism, the punty, and the carriage being in temporary repose. As the power for the actuation of the machine is applied by belting to the pulley 7 the shaft 6 is revolved. With the revolving of the shaft 6 and of the shaft 22 the left and right worms 23 and 24 on the latter cause the pairs of mutilated gear-wheels 29 and 30 to revolve in opposite directions. The teeth of the wheels 29 having just passed out of mesh with the rearward racks, the blank portions of the wheels 29 and 30 pass idly the racks. During the interval of time necessary for the travel of the wheels 29 and 30 through the distance 30$^a$ the punty mechanism, the punty, and the carriage, it will be observed, are in repose. With the meshing of the teeth of the wheels 30 with the teeth of the forward rack the carriage and punty mechanism are projected forwardly. Simultaneously the trigger-nose 41$^a$ has engaged the lug 43, whereby the support 37 commences its rotation, thereby releasing from the pressure of the head 70$^a$ the spring 51$^c$, which instantly draws into mesh the teeth of the bevel gear-wheels 53$^a$ and 54, which causes the revolution of the punty-bar. It will be seen as the motion of the divers parts proceeds the punty-rod revolves and is lifted, and as the support 37 is rotated ninety degrees of the circle and comes into the position as shown in Fig. 1 the punty has been lowered, and as the teeth of the wheels 30 complete their engagement with the forward racks the smooth portion of these wheels follow idly under the racks, permitting the carriage to again become stationary. Simultaneously the punty is being revolved in the molten glass, and as the charge of glass has been gathered the trigger-nose 41$^a$ has become disengaged by the contact of its arm with the trip 39, and simultaneously with the engagement by the teeth of the wheels 29 with the rearward racks occurs the engagement by the trigger-nose 42$^a$ with the lug 44. The movement of the carriage then proceeds rearwardly, the support 37 rotating in the direction of the movement of the gear-wheel 36, the punty revolving and after being raised by the shaft 50 again descending. With the completion of the rearward travel of the carriage the parts are all returned to the positions as shown in Fig. 4, the head 51$^b$ coming into contact with the head 70$^a$ a few seconds previous to the time of the disengagement of the trigger-nose 42$^a$ by the trip 40, during which momentary interval the punty has in its position over the mold ceased to revolve, so that the molten glass carried thereon may settle downwardly, to be severed by the human or mechanical means provided for severing the same, as the case may be, and thus the operation, by my invention, of gathering the glass, withdrawing the same from the tank, and the depositing of same may be continued with regularity, speed, and precision.

I am aware that many minor changes can be made in the construction and arrangement of parts of this machine without in the least departing from the nature and principles of my invention.

What I claim as my invention, and desire to secure by Letters Patent, is—

1. A glass-gathering machine including a foundation, a movable base thereon, means for laterally adjusting the position of said movable base, glass-gathering mechanism on said base, driving mechanism mounted transversely on said base, and means laterally movable on said driving mechanism for transmitting power to said glass-gathering mechanism in its various adjusted positions.

2. A glass-gathering machine including a base, a carriage reciprocable upon said base, a glass-gathering machine on said carriage, a continuously-rotating driving-shaft, and means driven thereby for intermittently reciprocating said carriage and maintaining the same stationary between the movements thereof.

3. A glass-gathering machine including a base, a carriage reciprocable on said base provided with a pair of racks, a glass-gathering machine on said carriage, mutilated gear-wheels for engaging said racks and means for driving said gear-wheels continuously in opposite directions.

4. A glass-gathering machine including a base, a carriage reciprocable upon said base provided with a pair of racks, a glass-gathering machine on said carriage, mutilated gear-wheels for engaging said racks, shafts for said mutilated gears, worm-wheels thereon, a continuously-rotative driving-shaft, oppositely-formed worms on said shaft that engage said worm-gears.

5. A glass-gathering machine including a punty, a holder therefor that is longitudinally slotted between its ends, a vertically-disposed gear-wheel with a pin extending from the face thereof through said slot adapted to vertically oscillate said punty-holder, a horizontally-revoluble means on which said gear is mounted, means mounted upon one end of said punty-holder provided with a pinion meshing with said gear-wheel for revolving said punty, and means for throwing said punty-revolving gear out of operation.

6. A glass-gathering machine including a carriage, a post extending upward therefrom, a horizontally-revoluble arm mounted on said post and extending above said post, a horizontal gear-wheel mounted on the upper end of said post, a gear-wheel mounted on said arm that meshes with the gear on said post, means for driving the gear on the post, a punty, a punty-holder pivotally, slidingly and eccentrically supported on said vertical gear, and means engaging said gear and mounted on the punty-holder for revolving the punty-rod whereby the punty may be continuously normally revolved, and the punty-holder may be vertically oscillated in any position it may assume during the horizontal oscillation thereof.

7. A glass-gathering machine including a carriage, a post extending upwardly therefrom, a horizontally-revoluble arm mounted on said post and extending above said post, means mounted on said post for horizontally oscillating said arm, a horizontal gear on the upper end of said post, means for driving said gear and the means for oscillating said arm, a gear-wheel mounted on said arm that meshes with the gear on said post, a punty, a punty-holder pivotally, slidingly and eccentrically supported on said vertical gear, and means engaging said gear and mounted on the punty-holder for revolving the punty-rod whereby the punty may be continuously normally revolved and the punty-holder may be vertically oscillated in any position it may assume during the horizontal oscillation thereof.

8. A glass-gathering machine including a vertical post, a punty, means for carrying said punty that is mounted on said post by two parallel portions thereof, so that said means will be horizontally oscillatory, a pair of horizontal bevel-gears mounted on said post, means for continuously driving said gears in opposite directions, means for transmitting power from said bevel-gears to said punty-supporting means, and stationary trips arranged to alternately connect said bevel-gears and punty-supporting means so that the same will have an oscillatory movement and for disconnecting said bevel-gears and punty-supporting means at the limits of said oscillatory movement.

In testimony whereof I have signed my name to this specification in the presence of two subscribing witnesses.

WILLIAM ALLES.

Witnesses:
CLARA A. PRIDDY,
CLIFFORD R. HITTY.